United States Patent
Sundararaman et al.

(10) Patent No.: US 11,836,501 B1
(45) Date of Patent: *Dec. 5, 2023

(54) SYSTEM AND METHODS FOR HARDWARE-BASED PCIE LINK UP BASED ON POST SILICON CHARACTERIZATION

(71) Applicant: Marvell Asia Pte Ltd, Singapore (SG)

(72) Inventors: Ramacharan Sundararaman, San Jose, CA (US); Nithyananda Miyar, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,388

(22) Filed: Jan. 18, 2023

Related U.S. Application Data

(63) Continuation of application No. 17/325,433, filed on May 20, 2021, now Pat. No. 11,586,446.

(60) Provisional application No. 63/027,910, filed on May 20, 2020.

(51) Int. Cl.
*G06F 9/4401* (2018.01)
*G06F 9/445* (2018.01)
*G06F 9/30* (2018.01)
*G06F 13/40* (2006.01)
*G06F 13/42* (2006.01)

(52) U.S. Cl.
CPC ........ *G06F 9/4406* (2013.01); *G06F 9/30054* (2013.01); *G06F 9/44505* (2013.01); *G06F 13/409* (2013.01); *G06F 13/4221* (2013.01); *G06F 2213/0026* (2013.01)

(58) Field of Classification Search
CPC .............. G06F 9/4406; G06F 9/30054; G06F 9/44505; G06F 13/409; G06F 13/4221
USPC ............................................... 713/2
See application file for complete search history.

(56) References Cited

U.S. PATENT DOCUMENTS

| | | | |
|---|---|---|---|
| 5,452,454 A * | 9/1995 | Basu ................. | H04L 9/40 |
| | | | 713/2 |
| 8,615,201 B1 * | 12/2013 | Li .................... | H04B 17/3912 |
| | | | 455/67.11 |
| 9,110,801 B2 * | 8/2015 | Kettley .............. | G06F 11/1469 |
| 10,275,259 B1 * | 4/2019 | Jain .................. | G06F 9/4411 |
| 11,586,446 B1 * | 2/2023 | Sundararaman .... | G06F 9/30054 |
| 2005/0147117 A1 * | 7/2005 | Pettey ................ | H04L 49/356 |
| | | | 370/463 |

(Continued)

*Primary Examiner* — Paul R. Myers

(57) ABSTRACT

A new approach is proposed to support hardware-based PCIe link up based on post silicon characterization of an electronic device. A non-volatile storage medium of a bootup unit on the electronic device maintains an initialization sequence for the physical layer of a PCIe link, and a non-volatile storage medium allows flexible programming. During operation, the bootup unit reads from the non-volatile storage medium instructions to program/override one or more PCIe physical layer settings and controller registers for the PCIe link based on the post silicon characterization of the electronic device. The bootup unit is limited to access and override only to the one or more physical layer settings and controller registers of the PCIe link. The entire process of reading the initialization sequence and programming the one or more PCIe physical layer settings and the controller registers happens within time limit constraints of the PCIe specification for latency reduction.

21 Claims, 2 Drawing Sheets

(56) References Cited

U.S. PATENT DOCUMENTS

| | | | |
|---|---|---|---|
| 2006/0184809 A1* | 8/2006 | Kojou | G06F 1/3203 713/300 |
| 2007/0233821 A1* | 10/2007 | Sullivan | G06F 11/142 709/227 |
| 2008/0022024 A1* | 1/2008 | Mao | H04L 41/0896 710/104 |
| 2009/0164684 A1* | 6/2009 | Atherton | G06F 13/387 710/300 |
| 2010/0011139 A1* | 1/2010 | Wang | H04L 12/403 710/110 |
| 2011/0258426 A1* | 10/2011 | Mujtaba | G06F 21/57 713/168 |
| 2013/0051483 A1* | 2/2013 | Wyatt | H04L 25/03885 375/259 |
| 2013/0191692 A1* | 7/2013 | Garlick | G06F 9/223 714/E11.201 |
| 2014/0082262 A1* | 3/2014 | Nachimuthu | G06F 12/0804 711/103 |
| 2014/0215112 A1* | 7/2014 | Iyer | G06F 13/4068 710/106 |
| 2016/0048192 A1* | 2/2016 | Matsunaga | G06F 13/38 713/340 |
| 2016/0283433 A1* | 9/2016 | Nair | G06F 9/4411 |
| 2016/0372027 A1* | 12/2016 | Hanchate | G09G 3/3614 |
| 2018/0034909 A1* | 2/2018 | Nachimuthu | H04L 41/0813 |
| 2018/0373878 A1* | 12/2018 | Jung | H04L 9/0894 |
| 2019/0042272 A1* | 2/2019 | Kotary | G06F 12/0638 |

\* cited by examiner

200

```
┌─────────────────────────────────────────────────────┐
│ Maintain instructions or code set based on post silicon │
│ characterization of an electronic device in a non-volatile │
│ storage medium of a bootup unit                     │
│                        202                          │
└─────────────────────────────────────────────────────┘
                          │
                          ▼
┌─────────────────────────────────────────────────────┐
│ Maintain an initialization sequence in a non-modifiable │
│ storage medium wherein, when executed by the bootup unit, │
│ the initialization sequence is configured to bring a PCIe │
│ link up for communication between components in the    │
│ electronic device                                    │
│                        204                          │
└─────────────────────────────────────────────────────┘
                          │
                          ▼
┌─────────────────────────────────────────────────────┐
│ Execute the initialization sequence to read from the non-volatile │
│ storage the instructions and code set based on the post silicon │
│ characterization of the electronic device           │
│                        206                          │
└─────────────────────────────────────────────────────┘
                          │
                          ▼
┌─────────────────────────────────────────────────────┐
│ Update one or more physical layer settings of the PCIe link and │
│ one or more registers of a PCIe controller of the PCIe link of the │
│ electronic device by programming and/or overriding current │
│ values of the one or more physical layer settings of the PCIe │
│ link and the one or more registers based on the instructions and │
│ code read from the non-volatile storage medium      │
│                        208                          │
└─────────────────────────────────────────────────────┘
```

FIG. 2

SYSTEM AND METHODS FOR HARDWARE-BASED PCIE LINK UP BASED ON POST SILICON CHARACTERIZATION

CROSS-REFERENCE TO RELATED APPLICATIONS

The instant application is a continuation application that claims the benefit and priority to the U.S. Nonprovisional patent application Ser. No. 17/325,433 that was filed on May 20, 2021, which claims the benefit and the priority to the U.S. Provisional Patent Application No. 63/027,910, filed May 20, 2020, which are incorporated herein in their entirety by reference.

BACKGROUND

Peripheral Component Interconnect (PCI) Express or PCIe is a high-speed serial computer expansion bus standard for communication links/connections among various components of an electronic device, including connections among graphics cards, hard disk drive host adapters, solid state drives (SSDs), Wi-Fi and Ethernet hardware. In some cases, the various components of the electronic device are integrated on a chip. The PCIe standard is a layered protocol, including a transaction layer, a data link layer, and a physical layer (PHY), wherein a physical PCIe link between two components comprises one or more lanes, which are dual simplex channels using two differential signaling pairs. The PCIe link is considered up (e.g., link up) when the PCIe link is set up to transmit data between the two components of the electronic device at a certain speed.

The physical layer settings of a PCIe link can be encoded/programmed under, for example, an 8b/10b encoding scheme (line code) to ensure that the PCIe link operates properly. In some cases, components of the electronic device need to go through post silicon or Post-Si characterization after the components are fabricated to make sure that the hardware and/or software of the components are in sync with each other. Following the post-Si characterization, a PCIe link-up may require new programming to the physical layer settings of the PCIe link based on the post silicon characterization of the components connected by the PCIe link. Given the PCIe time constraints from, for a non-limiting example, deasserting the PERST state (which triggers setup of the PCIe link) to asserting the DETECT state (which detects the presence of the PCIe link) to be within a tight time period, e.g., 20 ms, the programming of the physical layer settings of the PCIe link needs to be done at boot time of the electronic device. However, such programming does not allow for change in programming instructions or code based on the post silicon characterization. Although a fully programmable micro-controller with its own firmware can be used to bring the PCIe link up, the firmware itself may be unsecure, which causes concerns that the security and integrity of the electronic device may be compromised.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 depicts a flowchart of an example of a process to support hardware-based PCIe link up based on post silicon characterization according to an aspect of the present embodiments.

DETAILED DESCRIPTION

Figure 1:
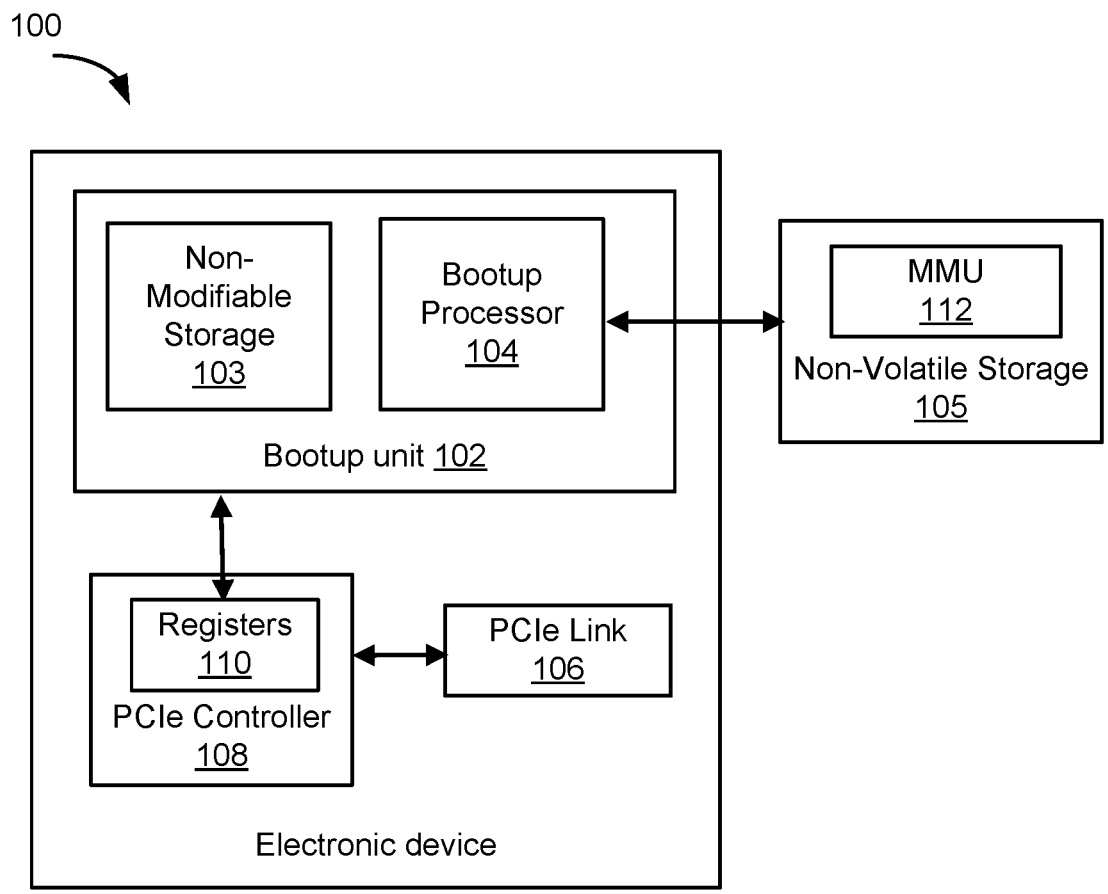
FIG. 1 depicts an example of a diagram of a system configured to support hardware-based PCIe link up based on post silicon characterization according to an aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A new approach is proposed that contemplates systems and methods to support hardware-based PCIe link up based on post silicon characterization of an electronic device or a chip. A non-modifiable (e.g., read only) storage medium of a bootup unit on the electronic device maintains an initialization sequence for the physical layer of a PCIe link and a non-volatile storage medium allows flexible programming. During operation, the bootup unit reads from the non-volatile storage medium instructions to program/override one or more PCIe physical layer settings and controller registers for the PCIe link based on the post silicon characterization of the electronic device. The bootup unit is limited to access and override only to the one or more physical layer settings and controller registers of the PCIe link. During the process, the bootup unit is not allowed to access or program any other part of the electronic device. The entire process of reading the initialization sequence and programming the one or more PCIe physical layer settings and the controller registers happens within time limit constraints of the PCIe specification for latency reduction.

Since the bootup unit is limited to access the PCIe physical layer and the controller registers only, the proposed approach is secure since no other part of the electronic device is allowed to be accessed or programmed by the bootup unit. Under the proposed approach, a programmable microcontroller having its own firmware is not required for the PCIe link up thus eliminating the security concerns with the firmware of the microcontroller. In addition, since the proposed approach is hardware-enforced, its security and reliability cannot be easily compromised while latency is reduced by keeping the entire process to be within one or more specified time constraints.

Although a Bootrom (or Boot ROM) is used as a non-limiting example of a non-modifiable storage medium in the bootup unit to illustrate the proposed approach in the embodiments described below, it is appreciated that the same or similar approach is equally applicable to other types of the non-modifiable storage medium for to support hardware-based latency reduction for PCIe link up based on post silicon characterization.

FIG. 1 depicts an example of a diagram of a system 100 configured to support hardware-based PCIe link up based on post silicon characterization. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a bootup unit 102, a non-volatile storage medium 105, a PCIe link 106 of an electronic device, and a PCIe controller 108 having one or more registers 110s. Each of these components in the system 100 is a dedicated hardware block/component or a software running on such hardware block/component. In some embodiments, one or more of these components are programmable by a user at a host (not shown) via software instructions for various operations. When the software instructions are executed by a processor, the one or more hardware components becomes a special purposed hardware component for practicing certain functions. In some embodiments, the components of the device 100 is on a single chip, e.g., a system-on-chip (SOC).

In the example of FIG. 1, the bootup unit 102 further includes a non-modifiable storage medium 103 and a bootup processor 104. The non-modifiable storage medium 103 is configured to maintain an initialization sequence to set the physical layer of the PCIe link 106 wherein when executed by the bootup processor 104, the initialization sequence is configured to bring the PCIe link 106 up for communication between components in the electronic device. Here, the non-modifiable storage medium 103 contains read-only code and can be, for a non-limiting example, a Bootrom or Boot ROM, which is a piece of mask read-only memory (ROM) or write-protected flash embedded inside the electronic device. The non-modifiable storage medium 103 contains the first set of code to be executed on power-on, reset or boot up of the electronic device. In some embodiments, the non-modifiable storage medium 103 includes a set of functions such as Roots of Trust (RoT), which are trusted functions that can be utilized by the bootup processor 104 to execute the initialization sequence to update one or more physical layer settings of the PCIe link 106 and/or the one or more registers 110 as discussed below.

In the example of FIG. 1, the non-volatile storage medium 105 is configured to maintain instructions or code to program/override the one or more physical layer settings of the PCIe link 106 and/or the one or more registers 110 of the PCIe controller 108 based on the post silicon characterization of the electronic device. Here, the non-volatile storage medium 105 can be but is not limited to a flash device, a solid state drive (SSD), an erasable programmable read-only memory (EPROM) that can be erased and re-used, or any other type of non-volatile storage drive. In some embodiments, the non-volatile storage medium 105 is external to the electronic device. In some embodiments, the non-volatile storage medium 105 is programmable/modifiable at runtime to include instructions or code that have been updated to reflect current states of the components of the electronic device post silicon characterization.

In the example of FIG. 0.1, the PCIe controller 108 is configured to control access to and set up of the PCIe link 106 for data communication between components of the electronic device. The one or more registers 110 of the PCIe controller 108 are configured to maintain various parameters and/or configuration data used by the PCIe controller 108 to set up the PCIe link 106. In some embodiments, a software interface is provided by the PCIe controller 108 to access the one or more registers 110. In some embodiments, the bootup unit 102 is configured utilize the software interface to program and override the one or more physical layer settings of the PCIe link 106 and/or the one or more registers 110 as discussed below.

During operation, the initialization sequence maintained in the non-modifiable storage medium 103 of the bootup unit 102 is interpreted by the bootup processor 104 to boot up the electronic device by setting up one or more stack, heap, and/or vector table of a memory management unit (MMU) 112 used to control access to the non-volatile storage medium 105. In some embodiments, the initialization sequence may include a branch statement or code, which causes the bootup processor 104 to begin branching and executing a different part of the instruction sequence in the non-modifiable storage medium 103 at an execute-in-place (XIP) base address to continue bringing up the PCIe link 106. Once the MMU 112 is set up, the bootup processor 104 of the bootup unit 102 proceeds to read the instructions from the non-volatile storage medium 105 via the MMU 112 in order to set up the physical layer of the PCIe link 106. In some embodiments, the bootup processor 104 is configured to execute (e.g., retrieve settings or parameters from) the instructions and/or code set read from the non-volatile storage medium 105 based on the post silicon characterization of the electronic device.

Once the instructions and/or code are read from the non-volatile storage medium 105 by the bootup processor 104, bootup unit 102 is configured to update the physical layer settings of the PCIe link 106 and/or the one or more registers 110 via the PCIe controller 108 by programming and overriding the current values of the one or more physical layer settings of the PCIe link 106 and/or the one or more registers 110 with the settings or parameters in the instructions and/or code set read from the non-volatile storage medium 105. Note that during the process, the bootup unit 102 is restrained/limited by the initialization sequence to be able to access and program/override only the one or more physical layer settings of the PCIe link 106 and/or the one or more registers 110 of the PCIe controller 108. The bootup unit 102 is not allowed to access or program any other components of the electronic device to ensure security and integrity of the electronic device. Since the one or more registers 110 of the PCIe controller 108 run/operate at the same clock speed as the rest of the components of the electronic device, the entire initialization sequence is executed and the one or more physical layer settings of the PCIe link 106 and/or the one or more registers 110 of the PCIe controller 108 are programmed within a certain time constraint as specified by a user or required by a PCIe standard specification and therefore achieves latency reduction during set up of the PCIe link 106. In some embodiments, the bootup unit 102 may continue the booting of the electronic device after the entire initialization sequence is executed and the physical layer settings of the PCIe link 106 and/or the one or more registers 110 of the PCIe controller 108 are programmed by branching to an XIP base address.

FIG. 2 depicts a flowchart 200 of an example of a process to support hardware-based PCIe link up based on post silicon characterization. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where instructions or code set based on post silicon characterization of an electronic device are maintained in a non-volatile storage medium. The flowchart 200 continues to block 204, where an initialization sequence is maintained in a bootup unit wherein, when executed by the bootup unit, the initialization sequence is configured to bring a PCIe link up for communication between components in the electronic device. The flowchart 200 continues to block 206, where the initialization sequence is executed by the bootup unit to read from the non-volatile storage medium the instructions and code set based on the post silicon characterization of the electronic device. The flowchart 200 ends at block 208, where one or more physical layer settings of the PCIe link and one or more registers of a PCIe controller of the PCIe link of the electronic device are updated by programming and/or overriding current values of the one or more physical layer settings of the PCIe link and the one or more registers based on the instructions and code read from the non-volatile storage medium.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A hardware-based system, comprising:
a non-volatile storage medium configured to maintain instructions or code set based on post silicon characterization of an electronic device; and
a bootup unit configured to
maintain an initialization sequence in a non-modifiable storage medium wherein, when executed, the initialization sequence is configured to bring a PCIe link up for communication between components in the electronic device;
execute the initialization sequence to read from the non-volatile storage medium the instructions and code set based on the post silicon characterization of the electronic device; and
update at least one attribute of the PCIe link of the electronic device by programming a value associated with at least one attribute of the PCIe link based on the instructions and the code set read from the non-volatile storage medium.

2. The system of claim 1, wherein:
the non-volatile storage medium is one of a flash device, and a solid state drive (SSD).

3. The system of claim 1, wherein:
the non-volatile storage medium is programmable and modifiable at runtime to include the instructions or the code that have been updated to reflect current states of the components of the electronic device post silicon characterization.

4. The system of claim 1, wherein:
the non-modifiable storage medium is a boot read only memory (ROM) or write-protected flash embedded inside the electronic device, wherein the boot ROM contains a first set of code to be executed on power-on, reset or boot up of the electronic device.

5. The system of claim 1, wherein:
the non-modifiable storage medium includes a set of functions to be utilized to execute the initialization sequence to update the at least one attribute of the PCIe link.

6. The system of claim 1, further comprising:
a PCIe controller configured to control access to and set up of the PCIe link for data communication between the components of the electronic device.

7. The system of claim 6, wherein:
one or more registers of the PCIe controller are configured to maintain configuration data used by the PCIe controller to set up the PCIe link.

8. The system of claim 1, wherein:
the bootup unit is restrained to access and program only the at least one attribute of the PCIe link.

9. The system of claim 1, wherein:
the initialization sequence is executed and the at least one attribute of the PCIe link is programmed within a certain time constraint as specified by a user or required by a PCIe standard specification.

10. The system of claim 1, wherein:
the initialization sequence includes a branch statement, which when executed, causes branching and executing a different part of the instruction sequence at an execute-in-place (XIP) base address.

11. The system of claim 10, wherein:
the bootup unit is configured to continue booting of the electronic device after the entire initialization sequence is executed and the at least one attribute of the PCIe link is programmed by branching to the XIP base address.

12. A hardware-based method, comprising:
maintaining instructions or code set based on post silicon characterization of an electronic device in a non-volatile storage medium of a bootup unit;
maintaining an initialization sequence in a non-modifiable storage medium wherein, when executed by the bootup unit, the initialization sequence is configured to bring a PCIe link up for communication between components in the electronic device;
executing the initialization sequence to read from the non-volatile storage medium the instructions and code set based on the post silicon characterization of the electronic device; and
updating at least one attribute of the PCIe link of the electronic device by programming a value associated with the at least one attribute of the PCIe link based on the instructions and the code set read from the non-volatile storage medium.

13. The method of claim 12, wherein:
the non-volatile storage medium is programmable and modifiable at runtime to include the instructions or the code that have been updated to reflect current states of the components of the electronic device post silicon characterization.

14. The method of claim 12, further comprising:
utilizing a set of functions to be utilized to execute the initialization sequence to update the at least one attribute of the PCIe link.

15. The method of claim 12, further comprising:
accessing one or more load registers via a software interface to determine that values stored in the load registers are valid.

16. The method of claim 12, further comprising:
controlling access to and set up of the PCIe link for data communication between the components of the electronic device.

17. The method of claim 12, further comprising:
maintaining configuration data in the one or more registers of a PCIe controller to set up the PCIe link.

18. The method of claim 12, further comprising:
restraining the bootup unit to access and program only the at least one attribute of the PCIe link.

19. The method of claim 12, further comprising:
executing the initialization sequence and programming the at least one attribute of the PCIe link within a certain time constraint as specified by a user or required by a PCIe standard specification.

20. The method of claim 12, further comprising:
continuing to boot the electronic device after the initialization sequence is executed and the at least one attribute of the PCIe link is programmed by branching to an execute-in-place (XIP) base address of the initialization sequence.

21. A hardware-based system, comprising:
a means for maintaining instructions or code set based on post silicon characterization of an electronic device; and
a means for maintaining an initialization sequence wherein, when executed, the initialization sequence is configured to bring a PCIe link up for communication between components in the electronic device;
a means for executing the initialization sequence to read from the non-volatile storage medium the instructions and code set based on the post silicon characterization of the electronic device; and
a means for updating at least one attribute of the PCIe link of the electronic device by programming a value associated with the at least one attribute of the PCIe link based on the instructions and the code set read from the non-volatile storage medium.

* * * * *